April 25, 1933.  E. R. MONROE  1,905,041
HYDRAULIC CLUTCH
Filed Aug. 25, 1930
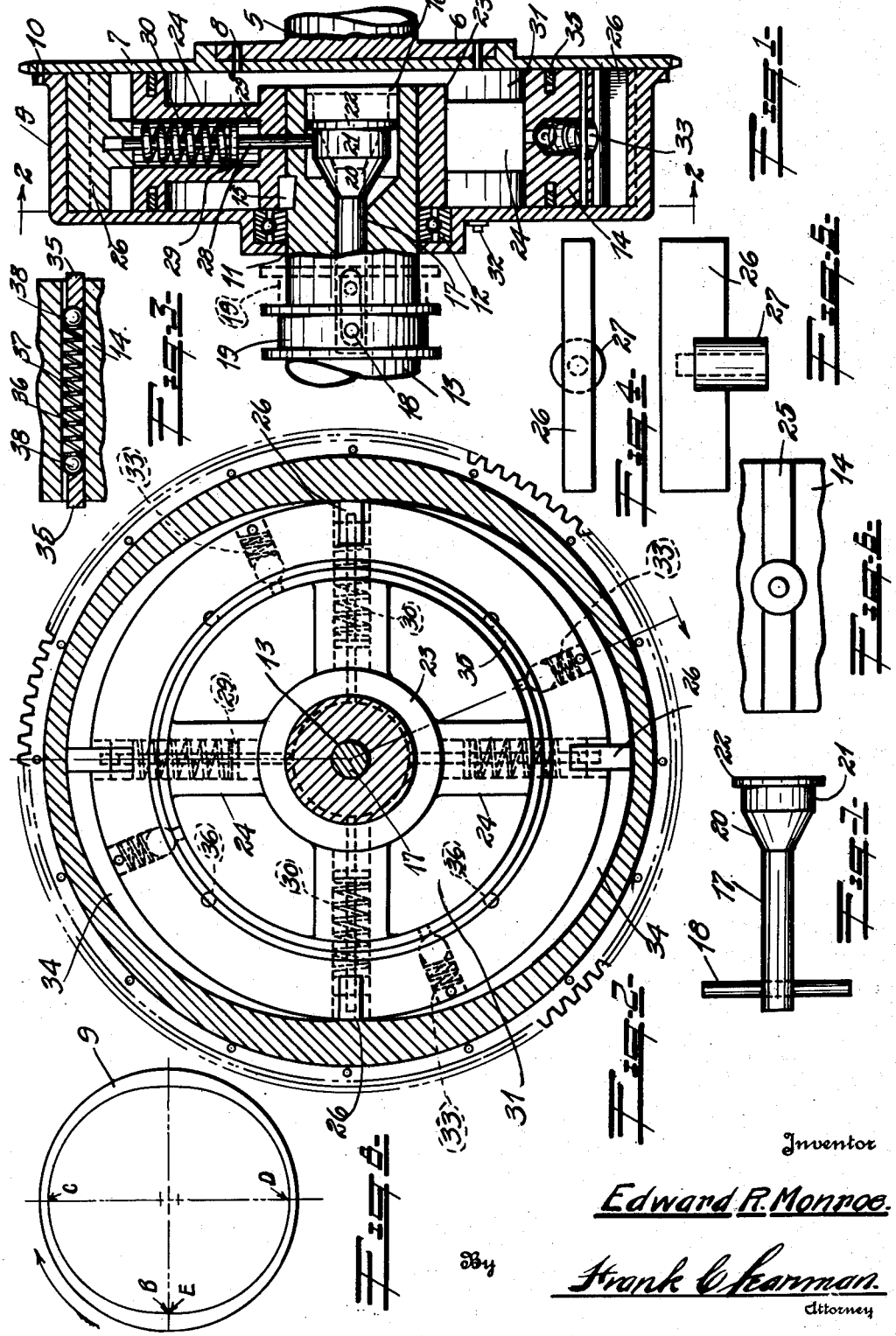
Inventor
Edward R. Monroe.
By
Frank C. Searman.
Attorney Patented Apr. 25, 1933

1,905,041

UNITED STATES PATENT OFFICE

EDWARD R. MONROE, OF BAY CITY, MICHIGAN, ASSIGNOR OF ONE-FOURTH TO CLYDE G. McPHERSON, OF BLACK RIVER, MICHIGAN

HYDRAULIC CLUTCH

Application filed August 25, 1930. Serial No. 477,504.

This invention relates to clutches and more especially to hydraulic clutches for use in automotive vehicles, boats, in connecting sections of line shafting; connecting a gear reducer and motor, or in fact any place a flexible clutch is desirable or applicable.

The prime object of the invention is to design a substantial, practical, and efficient flexible clutch which is of simple construction, of a minimum size, and which will be smooth and velvety in operation.

A further object is to design a hydraulic clutch which is applicable for use in connection with automotive vehicles, eliminating the usual plates and disks, and the cost and labor of manufacture, assembly and upkeep.

The above and other objects will appear as the specification progresses, reference being had to the accompanying drawing, in which I have shown the preferred embodiment of my invention, and in which like reference numerals indicate like parts throughout the several views thereof.

In the drawing.

Fig. 1 is a vertical sectional view through the clutch.

Fig. 2 is a transverse sectional view taken on the line 2—2 of Fig. 1.

Fig. 3 is a fragmentary sectional transverse view showing the oil ring.

Fig. 4 is a top plan view of the compression bar.

Fig. 5 is a side view of the compression bar.

Fig. 6 is a fragmentary plan view of the casing illustrating the assembly of the compression bar in the casing.

Fig. 7 is a side view of the pressure bar control.

Fig. 8 is a diagrammatic view of the shell.

Referring now more particularly to the drawing in which I have shown the preferred embodiment of my invention, the numeral 5 indicates the end of the crank shaft of a conventional automotive vehicle engine. This is provided with a flange 6 on the outer end thereof, and this flange is in turn bolted to an end plate 7 by means of bolts 8, said end plate being secured to the flanged end of the shell 9 of the clutch by means of bolts 10 and the edge of the flange is toothed as shown and for a purpose to be hereinafter described.

The opposite end of the housing is centrally bored as shown at 11 and is shaped to provide a seat for an anti-friction bearing 12 which is mounted therein, and in which a shaft 13 is journaled, a driven member 14 being keyed on said shaft by means of a key 15, the inner end of the shaft being bored as shown at 16, and a pressure bar control member 17 is mounted therein, the outer end of said bar control being provided with a transversely disposed pin member 18 which projects through a slotted opening in the driven shaft, the ends of the pin engaging a clutch collar 19 which is slidably mounted on said shaft.

The control bar is formed as clearly shown in Fig. 7 of the drawing, being provided with a tapered portion 20 which terminates in an enlarged section 21 having a flange 22 on the end thereof.

The driven member 14 comprises a hub 23 having a plurality of spokes 24 radiating therefrom, the outer rim being transversely slotted as shown at 25, (see Fig. 6), to accommodate the pressure bars 26, shown in detail in Figs. 4 and 5, said pressure bars being provided with a centrally disposed cylindrical stem 27 which is centrally bored to accommodate a pin member 28, a disk 29 being secured thereto intermediate its length. The spokes 24 are suitably bored as shown at 29ª to accommodate the pin and disk and a coil spring 30 is interposed between said disk and the end of the stem 27, and when the mechanism is in certain predetermined position, tends to force the pressure bars against the rim of the shell.

The lower end of the pin projects through the hub and driven shaft and engages the control bar, and it will be obvious that the outward pressure of the pressure bars is controlled by the position of the control bar, the spokes being of less width than the rim of the driven member, and an inner liquid reservoir 31 is provided between the rim and hub, a check valve 32 being provided to facilitate the filling of said reservoir.

Conventional ball check valves 33 are provided in the outer rim of the driven member 14 in spaced apart relation, and serve to permit the passage of oil or fluid from the inner chamber to the outer chamber 34, rings 35 being mounted in the edges of the rim of the driven member, and spaced apart transversely disposed passages 36 are formed in said rim, and accommodate coil springs 37, balls 38 being interposed between the ends of the spring and the rings, the inner edge of the rings being shaped to engage said balls, and it will be clearly obvious that an outward pressure is provided on these rings at all times, preventing any leakage of oil from one chamber to the other.

I wish to direct particularly attention to the eccentric shape of the interior or bore of the shell, and when this shell is rotating, the travel from "B" to "C" (see Fig. 8) creates a pressure on the pressure bars 26, from "D" to "E" the centrifugal force of the oil creates a suction, and the check valve 33 opens to admit oil from the chamber 31, the valve preventing return of the oil, as it overcomes the centrifugal force.

When the clutch is used on a conventional automotive vehicle the hook-up and operation is as follows:—

The assembled clutch is connected to the end of the engine crank shaft, displacing the present conventional clutch, and the shaft 13 is suitably connected to the automobile transmission (not shown) and this clutch is operated by a foot pedal in the usual manner.

The shell 9 is filled with oil or other suitable liquid to the level of the valve 32, and the clutch is now ready for operation.

When the engine is started the shell, (being connected to the engine crank shaft) revolves therewith, the pressure bars engaging the inner rim of the shell. The clutch collar is now shifted to position as indicated in dotted lines in Fig. 1, this releases the compression on the springs 30 so that the member 14 ceases to rotate. The gear shift is then operated in the usual manner, the clutch collar then shifts back to original position through the instrumentality of the usual spring in the clutch root lever.

When the clutch is used in an automotive vehicle or a boat it is possible to start on the direct connection or high speed, as first and intermediate are unnecessary only for heavily loaded cars or trucks, and by shifting into "high" and controlling the compression by a slow movement of the foot lever, no shifting of gears is necessary.

From the foregoing description it will be obvious that I have perfected a very simple, practical, and substantial hydraulic clutch.

What I claim is:—

1. In a hydraulic clutch comprising an eccentrically bored shell adapted to be connected to a driving member, a driven member journaled in said shell and including a shaft, said driven member being provided with a rim forming a chamber between said rim and shell, a liquid reservoir in the driven member and concentric with said chamber, and check valves mounted in said rim for admitting liquid from said reservoir to said chamber as the shell is rotated.

2. In a hydraulic clutch comprising a cylindrical eccentrically bored shell, a driven member journaled therein and provided with a rim, a liquid reservoir, pressure bars mounted in said driven member and engaging the bore, and means for automatically by-passing liquid from the reservoir through the rim of the driven member as the shell is rotated.

3. In a hydraulic clutch comprising an eccentrically bored shell adapted to be connected to a driving member, a driven member journaled therein and formed with a rim, a chamber surrounding said driven member, a centrally disposed liquid reservoir, spring actuated pressure bars mounted in said driven member and engaging said bore, means for automatically by-passing liquid from said reservoir to said chamber when the shell is rotated, and means for controlling the outward pressure of said pressure bars.

4. In a hydraulic clutch comprising an eccentrically bored shell, a driven member journaled in said shell and provided with a rim, rings mounted in said rim and forming a leak-proof connection with the shell, a chamber surrounding said rim, a centrally disposed liquid reservoir, spaced apart pressure bars resiliently mounted in said driven member and engaging the bore of the shell, means for regulating the outward pressure of the pressure bars, and means for automatically admitting liquid from the reservoir to said chamber when the shell is rotated.

5. In a hydraulic clutch comprising a shell, a driven member journaled therein and provided with a rim, means on the edges of the rim for forming a leak-proof connection between the shell and the rim, a chamber surrounding said rim, a liquid reservoir, spring actuated pressure bars mounted in said driven member and slidably engaging the bore of the shell, longitudinally movable means for regulating the outward pressure of the pressure bars, and automatic means for admitting liquid from the reservoir to the outer chamber as the shell is rotated.

6. In a hydraulic clutch comprising an eccentrically bored shell, a driven member journaled therein and provided with a rim forming a chamber between said member and the inner rim of said shell, a centrally disposed liquid reservoir, spaced apart resiliently mounted pressure bars mounted in said driven member and engaging the bore of the shell, a centrally disposed control member shiftably mounted in said driven member for regulating the outward pressure of said pressure bars, and automatic means for admitting liquid from the reservoir to the chamber as the shell is rotated.

7. In a hydraulic clutch comprising an eccentrically bored shell adapted to be connected to a driving member, a driven member journaled therein and forming a chamber surrounding said driven member, a centrally disposed liquid reservoir, means forming a leak-proof connection between said chamber and reservoir, spaced apart pressure bar assemblies resiliently mounted in said driven member and extending into said chamber, a centrally disposed shiftable control bar for regulating the outward pressure of said pressure bars, and check valves for admitting liquid from the reservoir to the chamber when the shell is rotated to create a suction in said chamber.

8. In a hydraulic clutch comprising an eccentrically bored shell, a shaft, a driven member mounted thereon and provided with a rim engaging the side walls of the shell and forming a chamber between said rim and shell, a liquid reservoir surrounding said shaft, pressure bars mounted in said driven member and engaging the bore of the shell, and means for automatically admitting liquid from said liquid reservoir to said chamber as the shell is rotated.

In testimony whereof I hereunto affix my signature.

EDWARD R. MONROE.